United States Patent [19] [11] 4,248,617
Kamo et al. [45] Feb. 3, 1981

[54] PROCESS FOR PRODUCING GRANULAR BASIC PHOSPHATE FERTILIZER

[75] Inventors: Seiichi Kamo; Tetzuo Watanabe; Kiyoshi Nakayama, all of Yokohama, Japan

[73] Assignee: Mitsubishi Chemical Industries Limited, Tokyo, Japan

[21] Appl. No.: 16,801

[22] Filed: Mar. 2, 1979

[30] Foreign Application Priority Data

Mar. 10, 1978 [JP] Japan .................................. 53/27346

[51] Int. Cl.$^3$ ............................................. C05B 11/16
[52] U.S. Cl. .......................................... 71/42; 71/47; 71/52; 71/64 D
[58] Field of Search .................. 71/33, 41, 42, 47, 52, 71/64 D, 64 DA, 64 DB, 64 DC, 62

[56] References Cited

U.S. PATENT DOCUMENTS

| | | | |
|---|---|---|---|
| 1,855,190 | 4/1932 | Kern | 71/42 |
| 2,070,697 | 2/1937 | Tromel | 71/47 |
| 3,110,583 | 11/1963 | Richardson | 71/61 |
| 3,298,822 | 1/1967 | Arvay et al. | 71/33 |

FOREIGN PATENT DOCUMENTS

| | | | |
|---|---|---|---|
| 2458647 | 6/1976 | Fed. Rep. of Germany | 71/33 |
| 2536595 | 12/1976 | Fed. Rep. of Germany | 71/52 |
| 2157683 | 6/1973 | France . | |
| 47-40268 | 10/1972 | Japan . | |
| 51-145764 | 12/1976 | Japan . | |
| 53-17162 | 2/1978 | Japan . | |

*Primary Examiner*—S. Leon Bashore
*Assistant Examiner*—Ferris H. Lander
*Attorney, Agent, or Firm*—Bierman & Bierman

[57] ABSTRACT

This invention relates to a process for producing a granular phosphate fertilizer by reacting and granulating simultaneously a mixture of a basic material which contains acid-soluble CaO and acid-soluble MgO, and also acid-soluble $SiO_2$, with phosphoric acid and/or an acidic phosphate in such a mixing ratio that $$A/MO = 0.05 - 0.45$$

[in which MO represents moles of the acid-soluble alkaline earth metals in the basic material (calculated as their oxides) and A represents moles of the phosphoric acid or the free phosphoric acid derived from the acidic phosphate (calculated as $P_2O_5$)]. This process makes use of industrial wastes, as the starting basic material, such as slag discharged from metal refining and fly ash. The granular fertilizer obtained by the process is high in granule hardness, easy to handle, and high in phosphate fertilization effect and gives an effect on improving acidic soil.

7 Claims, No Drawings

PROCESS FOR PRODUCING GRANULAR BASIC PHOSPHATE FERTILIZER

BACKGROUND OF THE INVENTION

This invention relates to a process for producing a granular, basic phosphate fertilizer. More particularly, it relates to a process for producing a granular, basic phosphate fertilizer which is difficult to disintegrate and difficult to dust against a physical stress such as by transport or mechanical fertilization operation and which exhibits an effect on improving acidic soil.

In countries where the climate is mild and rainy, bases are readily leached off from soil, permitting acidic soil to be distributed all over the country. Since the acidification of soil not only brings about a lowering of utilization rate of fertilizer components by crop, but also causes physical disorders of various crops, there have been developed a diversity of acidic soil improvers.

As for the fertilization effect in acidic soil, phosphate fertilizer may be typical fertilizer components which are sharply lowered in their effect. Various types of phosphate fertilizer have been thus proposed so as to improve the utilization rate. In this sense, a basic phosphate fertilizer showing the effect on improving acidic soil besides other desirable properties may be said to be one of desirous types of fertilizer.

Mentioned as one of basic phosphate fertilizers which are now commercially available is a fused phosphate fertilizer. As is well known in the art, the fused phosphate fertilizer is an amorphous powdery basic phosphate fertilizer obtained by thermally fusing a phosphate ore and a $SiO_2$ and MgO containing material such as serpentine and rapidly cooling the fused components with cold water. This fused phosphate fertilizer is in most cases applied as a straight fertilizer because of a high estimation of its improving effect on the acidic soil. However, as the cost of energy rises sharply in recent years, the production of the fused phosphate fertilizer using a fusing process has become poorer in economy year by year, which makes its cost relatively higher than that of other fertilizers in relation to the unit of its available $P_2O_5$.

In its physical aspects, the fused phosphate fertilizer has rather heavy density (an apparent density of 1.5-1.7) and is in the form of vitreous powder, so that there have been pointed out from long ago several disadvantages in handling, based on the inherent physical nature of products, such as a difficulty of uniform spraying in large amount and a problem of dust scattering of the vitreous powder on the spraying. In order to overcome these disadvantages, there have been proposed granulation processes such as in Japanese Patent Publication Nos. 39-3022, 39-22916 and 42-25179 but they have not been yet put into practice, leaving the problems unsettled as before. Thus, there does not exist any granular, basic phosphate fertilizer which is excellent in economy, fertilization effect, and handling characteristics along with an excellent effect on improving acidic soil. Accordingly, it is highly desired to realize the production of a fertilizer of the just-mentioned type as early as possible.

We have pursued the extensive studies to economically produce a granular, basic phosphate fertilizer which is easy to prepare, excellent in handling characteristics and high in effect of phosphate fertilizer together with a effect on improving acidic soil. As a result, it has been found that a granular, basic phosphate fertilizer can be produced advantageously from an industrial standpoint by a process which comprises mixing a secondarily produced basic material, such as slag, containing acid-soluble CaO and/or acid-soluble MgO and acid-soluble $SiO_2$ which phosphoric acid and/or acidic phosphate in a specific ratio, and granulating and reacting the mixture at the same time. The term "acid-soluble" used in this specification and claims means "soluble in the aqueous N/2-HCl solution". The fertilizer obtained by the process is hardly susceptible to disintegration and dusting when undergoing physical stresses caused by, for example, transport or mechanical applications of fertilizer, excellent in handling characteristics, and high in effect of phosphate fertilizer, and has an effect on improving acidic soil. The present invention is accomplished on the basis of the above finding.

SUMMARY OF THE INVENTION

According to the present invention, there is provided a process for producing a granular basic phosphate fertilizer which comprises mixing a basic material containing acid-soluble CaO and/or acid-soluble MgO, and acid-soluble $SiO_2$ and which has a phosphorus content of below 2% (by weight) calculated as $P_2O_5$, with phosphoric acid and/or an acidic phosphate in such a mixing ratio defined by an equation (1)

$$A/MO = 0.05 - 0.45 \tag{1}$$

(in which MO represents moles of acid-soluble alkaline earth metals in the basic material calculated as their oxides and A represents moles of phosphoric acid and/or free phosphoric acid derived from the acidic phosphate calculated as $P_2O_5$), then carrying out the granulation and the reaction of the mixture simultaneously.

DETAILED DESCRIPTION OF THE INVENTION

The present invention will be described in detail.

The basic material used as a starting material of the invention is one which contains acid-soluble CaO, acid-soluble MgO or a mixture thereof and soluble $SiO_2$. Ordinarily as the starting material, various industrial wastes produced through processes of high temperatures exceeding 1000° C. are employed. Typical of the wastes are a blast furnace slag and a converter slag produced on making of iron and steel, slags discharged from metal refinings of ferromanganese, ferronickel, ferrosilicon, nickel, stainless steel, phosphorus and so on. The dust generated during the production of carbide, cement and the like or combustion ash of very fine coal (i.e. fly ash) may be likewise used. These starting materials are substantially free of phosphorus or have, if any, a phosphorus content of below 2% calculated as $P_2O_5$ and thus can not be used as a phosphate fertilizer as it is. In the practice of the invention, the diverse industrial wastes are used as the basic material singly or in combination of two or more.

Typical of the basic material useful as one of the starting materials is one of which is substantially composed of oxides of calcium, magnesium, silicon, aluminium and iron with 50% or more of the alkaline earth metals and silicon being acid-soluble. In some cases, there may be added to the above-described industrial waste basic lime and basic magnesia materials such as slaked lime, calcium carbonate, magnesium hydroxide, dolomite and the like so as to control the composition of a basic material. The amount of the added materials in the basic material should preferably be in the range below 30% (by weight).

The ratio of the acid-soluble alkaline earth metals to the acid-soluble $$SiO_2 \left[ \frac{CaO + MgO}{SiO_2} \right.$$

(by mole)] in the basic material is generally in the range of 1:0.05–2.00, preferably 1:0.10–1.00.

The content of the acid-soluble alkaline earth metals and the soluble $SiO_2$ in the basic material is preferred to be as high as possible but the material may contain insoluble matter. This allows the use, as the starting material, of a material such as a gradually cooled converter slag which has low contents of the acid-soluble components. It will be noted here that the solubility (ratio of soluble component to total component) of material is determined by a method as prescribed in Fertilizer Analysis Method (issued by the National Institute of Agricultural Science of Japan). That is to say, 2.5 g of a basic material is charged into 200 ml of 0.5 N hydrochloric acid and the mixture is boiled for 5 minutes, to which is added, after cooling, 250–500 ml of water, followed by filtering with use of dry filter paper and quantity of the respective components dissolved in the filtrate is determined.

In case where a material such as a slag which becomes higher in solubility with a smaller particle size thereof is used as the starting basic material, it is preferred to use fine powder so as to increase the solubility. In general, the basic material useful for the purpose of the invention contains the acid-soluble alkaline earth metals and acid-soluble $SiO_2$ in a total amount ($CaO+MgO+SiO_2$) of above 50% (by weight).

The starting phosphoric acid used is ordinarily so-called wet process phosphoric acid which is obtained by decomposition of phosphate ore or apatite with a mineral acid such as sulfuric acid, nitric acid, hydrochloric acid, phosphoric acid or a mixture thereof. Phosphoric acid produced by a furnace process may be likewise used. Examples of the acidic phosphates are calcium superphosphate, triple superphosphate, ammonium phosphate and the like substances which are capable of releasing free phosphoric acid reactive with the basic material.

In order to attain the purpose of the invention, it is essential that the reaction and the glanulation of the basic material and phosphoric acid and/or an acidic phosphate are carried out simultaneously. The reaction is a reaction between the base and the acid and can thus be readily made by merely mixing to allow the contact of the both components. When the phosphoric acid source is a solid such as an acidic phosphate, they are contacted under such conditions as to be capable of releasing free phosphoric acid, e.g. in the presence of water. In order to carry out the simultaneous granulation and reaction, the reaction is conducted in a granulator. The useful reaction granulator may be any of devices ordinarily employed to granulate compound fertilizers, e.g. a rotary drum granulator and a dish granulator. In addition, a fluidized bed granulator and a paddle mixer-type granulator may be also used.

Where a solid phosphoric acid source, e.g. powder of an acidic phosphate, is used, powder of the basic material and the phosphate powder in a predetermined ratio are uniformly mixed in a mixing vessel, over which water is sprayed in a granulator wherein granules are made with the aid of the sprayed water while inducing the reaction. If necessary, the granules are dried to obtain a granular product.

On the other hand, when using a phosphoric acid source of a liquid or slurry form, for example, a solution of phosphoric acid or an acidic phosphate, it is added to powder of a basic material or a mixture of powder of a basic material and powder of an acidic phosphate which has been previously prepared. If necessary, water is further added to the reaction system, which is then carried out the reaction and granulation and, if necessary, dried to obtain a product.

In short, all the starting solid powdery materials are first mixed, to which a liquid material is added, followed by granulation under mixing condition. If necessary, water may be added in controlled amount for use as "granulation water" (i.e. water serving as a binder for powder in the granulation operation).

The mixing ratio between the basic material and phosphoric acid and/or the acidic phosphate is required to give such a composition as defined by the following equation with regard to the moles of the acid-soluble alkaline earth metals, calculated as their oxides, contained in the basic material and the moles, calculated as $P_2O_5$, of phosphoric acid and/or free phosphoric acid derived from the acidic phosphate $$A/MO = 0.05 - 0.45$$

(in which MO and A have the same meanings as defined hereinbefore in equation (1), respectively). Preferably, the ratio A/MO is 0.10–0.40.

The term "free phosphoric acid derived from the acidic phosphate" used herein means phosphoric acid releasable from an acidic phosphate in the presence of water. This will be illustrated as follows:

When using calcium superphosphate as the acid phosphate; $Ca(H_2PO_4)_2 \cdot H_2O$, a principal component of the calcium superphosphate, is dissociated in the presence of water as shown in the following equation, so that it can be considered that 1 mole of phosphoric acid is released from 1 mole of $Ca(H_2PO_4)_2 \cdot H_2O$ in the presence of water.

$$Ca(H_2PO_4)_2 \cdot H_2O + nH_2O \rightleftarrows H_3PO_4 + CaHPO_4 \cdot 2H_2O$$

When ammonium phosphate is used as the acidic phosphate; It is assumed that 1 mole of phosphoric acid is released from 2 moles of $(NH_4)H_2PO_4$ as follows, $$2(NH_4)H_2PO_4 \rightleftarrows (NH_4)_2HPO_4 + H_3PO_4$$

According to the present invention, basic and hard granules can be obtained by carrying out the simultaneous reaction and granulation of the starting materials in such a ratio as defined hereinbefore.

If the quantity of free phosphoric acid is less than the defined range, granules which have a sufficiently high hardness can not be obtained though the granulation is feasible. Presumably, this is because the reaction of skeletal formation between the basic material and free phosphoric acid which is considered as a main factor of developing the granule hardness does not occur to a satisfactory extent.

When the quantity of free phosphoric acid is in excess, on the other hand, the skeletal formation reaction takes place excessively, resulting not only in a lowering of the granule hardness, but also in a loss of basicity of the product.

In some cases, the product is rendered acidic, by which a desired effect of the invention can not be attained.

Where the starting materials are reacted in a mixing molar ratio within the range defined hereinbefore, but granulation is carried out after completion of the reaction with use of water as a binder according to the usual method, it is possible to make granular fertilizer which shows a basicity, but it will exhibit a very low hardness of granule and a poor resistance to physical stress and will be readily disintegrated.

Thus, it is essential in the present invention to control the starting materials in a specific molar ratio and that the granulation operation is conducted simultaneously with reaction. In doing so, there can be obtained a granular basic phosphate fertilizer which is very high in granule hardness, excellent in handling characteristics and high in effect on improving acidic soil.

During the course of the production of the fertilizer of the invention, there may be added to the reaction system organic materials for further improving the soil-improving effect or micronutrient element sources such as of Mo, Zn, B, Mn, Fe, Cu and the like elements which are essential nutrients for crops.

The advantages of this invention described hereinabove will be illustrated with reference to the conditions required for the granulation operation according to the invention.

(1) Relation between Reaction Molar Ratio and Physical Properties of Product

A ferronickel slag (acid-soluble MgO: 24.7%, acid-soluble CaO: 12.1%, acid-soluble $SiO_2$: 40.7%) or an iron-making blast furnace slag (acid-soluble MgO: 5.3%, acid-soluble CaO: 34.8%, acid-soluble $SiO_2$: 29.1%) and wet process phosphoric acid ($P_2O_5$: 42%) were used in different molar ratios indicated in Table 1.

To the respective slag powders were added predetermined amounts of wet process phosphoric acid, to which was further added water in suitable amount if the moisture for granulation was not sufficient, followed by granulating in a dish granulator for 15 minutes. After drying, a product of a particle size of 2.0–2.4 mm was collected in each case and its physical properties were measured. The reaction molar ratios and the physical properties of product are shown in Table 1 below.

TABLE 1

| Sample No. | Type of Slag | Reaction Molar Ratio[1] A/MO | pH of Product (1 g of sample in 100cc $H_2O$) | Hardness of Granule[2] (kg/granule) |
|---|---|---|---|---|
| 1 | | 0.02 | 9.70 | 0.24 |
| 2 | | 0.05 | 9.62 | 0.82 |
| 3 | | 0.10 | 9.18 | 1.53 |
| 4 | Ferronickel | 0.15 | 9.05 | 1.92 |
| 5 | Slag | 0.20 | 8.75 | 1.96 |
| 6 | | 0.30 | 8.22 | 2.05 |
| 7 | | 0.40 | 7.88 | 1.48 |
| 8 | | 0.45 | 7.57 | 0.78 |
| 9 | | 0.48 | 7.04 | 0.40 |
| 10 | | 0.50 | 6.73 | 0.40 |
| 11 | | 0.55 | 5.91 | 0.05 |
| 12 | | 0.02 | 9.20 | 0.60 |
| 13 | | 0.05 | 8.98 | 0.92 |
| 14 | Iron-making | 0.10 | 8.66 | 1.33 |
| 15 | Blast Furnace | 0.15 | 8.39 | 2.17 |

TABLE 1-continued

| Sample No. | Type of Slag | Reaction Molar Ratio[1] A/MO | pH of Product (1 g of sample in 100cc $H_2O$) | Hardness of Granule[2] (kg/granule) |
|---|---|---|---|---|
| 16 | Slag | 0.25 | 8.04 | 2.16 |
| 17 | | 0.35 | 7.87 | 1.84 |
| 18 | | 0.40 | 7.46 | 1.23 |
| 19 | | 0.45 | 7.14 | 0.72 |
| 20 | | 0.50 | 6.22 | 0.15 |
| 21 | | 0.60 | 5.35 | 0.05 |

[1] The value means the number of moles of added phosphoric acid as $P_2O_5$ divided by the number of total moles of acid-soluble CaO and MgO.
[2] The hardness of granule was determined as follows: Dried granule with a particle size of 2.0–2.4 mm was placed on a food scale and pressed to measure the load by kg on breaking to pieces. Test was repeated and an average value of 20 granules were shown.

As will be seen from the results of Table 1, the basicity of the product decreases with an increase of the reaction molar ratio.

The reason why the pH of product varies depending on the type of the slag used even at the same level of the reaction molar ratio would be depend upon the inherent characteristics of the individual slags. As for the hardness of the granular product, the hardness increase with an increasing of reaction molar ratio but is lowered sharply when the reaction molar ratio exceeds 0.45. This tendency is substantially on the same line irrespective of the type of slag which means the hardness of the granular product is greatly influenced by the reaction molar ratio.

In order to produce granules which have a preferable hardness from a standpoint of handling characteristics, it is necessary to conduct the granulation simultaneously with reaction of the starting materials in a ratio of 0.05–0.45, preferably 0.10–0.40.

(2) Effect of Manner of Reaction and Granulation on Hardness of Product Granules Ferronickel slag powder and wet process phosphoric acid as used above were provided in reaction molar ratios of 0.10, 0.20 and 0.30, respectively. On one hand, granules were obtained by effecting the granulation and reaction simultaneously in accordance with the process of the invention and then drying. On the other hand, the slag powder and wet process phosphoric acid of a predetermined amount were reacted without granulation, dried and pulverized. The obtained powder was granulated in a dish granulator with use of water as a binder and dried to give a test sample. The test samples (granules with a size of 2.0–2.4 mm) were each measured with values of the physical properties shown in Table 2.

| Granulation Method | Reaction Molar Ratio $P_2O_5$/MO | pH of Product (1 g of sample in 100cc $H_2O$) | Hardness of Granule (kg/granule) |
|---|---|---|---|
| Granulation with reaction at the same time (process of invention) | 0.10 | 9.20 | 1.58 |
| | 0.20 | 8.75 | 2.02 |
| | 0.30 | 8.24 | 1.93 |
| Granulation using water after reaction | 0.10 | 9.17 | 0.05 |
| | 0.20 | 8.74 | 0.04 |
| | 0.30 | 8.22 | 0.05 |

As will be seen from Table 2, it was confirmed that the granular basic phosphate fertilizer with very high hardness and excellent handling characteristics can be made in accordance with the invention by setting the reaction molar ratio in the specified range and also by conducting the granulation operation simultaneously with reaction. The reason why these good results are obtained is not completely known. However, according to the results of the analysis of the internal structure of granule using chemical analysis, X-ray diffraction analysis and electron microscope, how such a high hardness of granule is developed is believed in outline as follows. The composition of the product obtained according to the process of the invention is assumed to be composed of the three main components, the gel-like silicon component of rection product, fine crystals of water-insoluble alkaline earth metal phosphates (e.g. $CaHPO_4 \cdot 2H_2O$, $MgHPO_4 \cdot 3H_2O$), and unreacted coarse basic material. The silicon component combines with other two components during the course of gelation as if it is a binder, and the high hardness of the fertilizer granules is believed to be developed as the gelation is accomplished. The above-indicated three components and their ratio will give a great influence on the development of the hardness of granules. As shown in Table 1, the mere increase of the reaction molar ratio does not lead to an increase of the hardness. Presumably, this is because the reaction proceeds excessively under such conditions that the molar ratio of reaction exceeds 0.45, so that the unreacted coarse basic material is consumed in extremely large amount, and the ratio of the three components are imbalanced, resulting in a lowering of the granule hardness.

On the other hand, when granules are made, without granulating simultaneously with the reaction, by drying and powdering a reaction product and granulating the obtained powder using water as binder, high hardness of granules can not be attained. This is considered as follows: The silicon component which had gelled by the drying treatment is turned inactive and does not serve as a binder when carrying out the granulation with use of water as in the case of the simultaneous reaction and granulation procedure of the invention.

It is believed that only when the granulation operation is conducted simultaneously with reaction in the specific range of the molar ratio defined in the invention, the ratio of the three main components suitable for assuring the high hardness is established and the silicon component which becomes active during the reaction can be effectively utilized.

The present invention will be particularly illustrated by way of examples, which should not be construed as limiting thereto the present invention since various modifications and changes may be made without departing from the spirit and scope of the invention.

In Examples, T-$P_2O_5$ means total phosphoric acid, S- means "acid-soluble" as defined previously, and C- means "soluble in 2% citric acid solution". The measurements were conducted in accordance with Analytical Methods for Fertilizer. In addition, the pH was measured by dissolving 1 g of a powdered sample in 100 g of distilled water, and the granule hardness was an average of 20 granules with a size of 2.0–2.4 mm, determined by same method as Table 1.

EXAMPLE 1

30.0 kg of a ferronickel slag powder (S-CaO 12.1%, S-MgO 24.7%, and S-$SiO_2$ 40.7%) and 35 kg of a carbide furnace dust (S-CaO 56.6%, S-MgO 16.1%, S-$SiO_2$ 9.4%) were mixed and the mixture was granulated for 15 minutes simultaneously with reaction in a dish granulator having an inner diameter of 1 m. and rotated at 40 r.p.m. while spraying 73.2 kg of wet process phorphoric acid ($P_2O_5$ 28%). After drying, 100. kg of a granular product was obtained.

The granular product had the following physical characteristics.

| Analytical Values of Components contained (%) | |
|---|---|
| T—$P_2O_5$ | 20.37% |
| C—$P_2O_5$ | 20.37% |
| S—CaO | 24.12% |
| S—MgO | 13.08% |
| C—MgO | 12.36% |
| S—$SiO_2$ | 15.30% |
| pH: 8.48 | |
| Granule hardness: 1.81 kg/granule | |

EXAMPLE 2

12.6 kg of a ferronickel slag powder (S-CaO 12.1%, S-MgO 24.7%, S-$SiO_2$ 40.7%), 35.0 kg of a carbide furnace dust (S-CaO 56.6%, S-MgO 16.1%, S-$SiO_2$ 9.4%) and 58.0 kg of triple superphosphate ($P_2O_5$ 44.0%) were mixed. The mixture was granulated simaltaneously with reaction for 15 minutes in a dish granulator having an inner diameter of 1 m. and rotated at 40 r.p.m. while spraying water over the mixture and dried to obtain 102.5 kg of granular product. The thus obtained granular product had the following physical characteristics.

| | |
|---|---|
| T—$P_2O_5$ | 25.48% |
| C—$p_2O_5$ | 25.45% |
| S—CaO | 31.61% |
| S—MgO | 8.82% |
| C—MgO | 8.47% |
| S—$SiO_2$ | 7.92% |
| pH: 10.84 | |
| Granule hardness: 1.74 kg/granule | |

EXAMPLE 3

140 kg of crude magnesium hydroxide (MgO 60%) was mixed with 1,200 kg of stainless steel slag powder (S-CaO 42.8%, S-MgO 11.3%, S-$SiO_2$ 18.6%) and the mixture was granulated simultaneously with reaction in a rotary drum granulator having an inner diameter of 1 m. and a length of 5 m. and rotated at 24 r.p.m. while spraying 1,360 kg of wet process phosphoric acid ($P_2O_5$ 30.0%). The granules were dried to obtain 2,008 kg of a granular product. The granular product had the following physical characteristics.

| Analytical value of components contained (%) | |
|---|---|
| T—$P_2O_5$ | 20.38% |
| C—$P_2O_5$ | 20.38% |
| S—CaO | 25.68% |
| S—MgO | 10.92% |
| C—MgO | 10.88% |
| S—$SiO_2$ | 11.04% |
| pH: 8.87 | |
| Granule hardness: 1.92 Kg/granule | |

Then, the fertilization effect test was conducted using the product obtained in Example 1 (granule size 0.7–3.0 mm), a fused phosphate fertilizer (C-$P_2O_5$ 21.2%, C-MgO 17.2%, S-CaO 30.9%, S-$SiO_2$ 22.7%) which is one of known basic fertilizers, and calcium superphosphate (S-$P_2O_5$ 19.5%) for comparative purpose.

| Fertilization effect test | |
|---|---|
| Crop: | wheat (var. Norin No. 26) |
| Scale: | Field test, 8 m² per plot, 3 plots |
| Soil: | Volcanic ash soil |
| Fertilizer: | Ammonium sulfate (N 21%) and potassium chloride (K₂O 60%) were added as an N and a K components, respectively. |

| Fertilizers | N | C-P$_2$O$_5$ | K$_2$O (%) |
|---|---|---|---|
| granular product of this invention + ammonium sulfate + potassium chloride | 12.6 | 13.5 | 12.6 |
| fused phosphate fertilizer + ammonium sulfate + potassium chloride | 12.6 | 13.5 | 12.6 |
| calcium superphosphate + ammonium sulfate + potassium chloride | 12.6 | 13.5 | 12.6 |

| Fertilization | |
|---|---|
| N: basal dressing | 6 kg/1,000 m² |
| top dressing | 6 kg/1,000 m² |
| P$_2$O$_5$: whole amount used for basal dressing | 13 kg/1,000 m² |
| K$_2$O: basal dressing | 6 kg/1,000 m² |
| top dressing | 6 kg/1,000 m² |
| Culture | |
| Basal dressing | November 20 |
| Top dressing | (N, K) March 16 |
| Seeding | November 21 |
| Harvesting | June 9 |

| | Investigation of Growth (in average) (The numbers of stem and ear are, respectively, indicated as numbers/50 cm in distance) | | | | | | |
|---|---|---|---|---|---|---|---|
| | December 10 | | March 14 | | Harvest Time | | |
| Fertilizers | plant length (cm) | the number of stem | plant length (cm) | the number of stem | culm length (cm) | ear length (cm) | the number of ear |
| granular product of the invention + ammonium sulfate + potassium chloride | 14.4 | 65.2 | 29.3 | 244.8 | 96.8 | 8.4 | 172.2 |
| fused phosphate fertilizer + ammonium sulfate + potassium chloride | 13.2 | 64.1 | 27.8 | 238.5 | 96.5 | 8.3 | 159.8 |
| triple superphosphate + ammonium sulfate + potassium chloride | 14.8 | 65.4 | 28.9 | 243.6 | 96.7 | 8.4 | 162.7 |

| | Investigation of Yield (in average) | | | | |
|---|---|---|---|---|---|
| | Total | Stem | Grain | | 1000-kernel |
| Fertilizers | Amount kg/100m² | Weight kg/100m² | Weight kg/100m² | Weight Index | - weight g |
| granular product of the invention + ammonium sulfate + potassium chloride | 133.8 | 58.3 | 48.3 | 109.3 | 42.3 |
| fused phosphate fertilizer + ammonium sulfate + potassium chloride | 124.4 | 55.7 | 44.2 | 100.0 | 41.8 |
| calcium super-phosphate + ammonium sulfate + potassium chloride | 127.2 | 56.0 | 45.1 | 102.0 | 42.1 |

As will be apparent from the above test results, as to the stem weight and grain weight, the test plot using the granular basic phosphate fertilizer is more excellent than the test plots using the known fused phosphate fertilizer and triple superphosphate. This is considered because the fertilizer of the invention is relatively rapidly converted, though in a granular form, to an available nutrient in the soil and immediately contributes to expedite the growth of the test crop, whereas, with the fused phosphate fertilizer, its availabilization does not proceed immediately and part of the fertilizer remains in the soil as it is.

With the calcium superphosphate, the fertilization effect develops most readily among the three fertilizers. However, this is considered because the superphosphate itself is an acidic fertilizer and the activities of aluminium and iron become high in a volcanic ash soil such as used in the above test to increase a degree of fixation of the phosphorus component.

What is claimed is:

1. A process for producing a granular basic phosphate fertilizer comprising the steps of providing a basic material which contains at least one member selected from the group consisting of acid-soluble CaO, acid-soluble MgO, and mixtures thereof, said material also comprising acid-soluble SiO$_2$, and having a content of phosphorus below 2% by weight calculated as P$_2$O$_5$, mixing said material with phosphoric acid and/or an acidic phosphate in a mixing ratio of $$A/MO = 0.05 \text{ to } 0.45$$

wherein MO is the number of moles of acid-soluble alkaline earth metals in the basic material, calculated as their oxides, and A as the number of moles of phosphoric acid and/or free phosphoric acid dervied from the acidic phosphate calculated as P$_2$O$_5$, the mole ratio of said metals to said $SiO_2$ being 1 to 0.05–2.00, permitting said acid and said material to react in a granulating means, whereby granulation and reaction of the mixture are carried out simultaneously.

2. A process according to claim 1, wherein said mixing ratio is 0.10 to 0.40.

3. A process according to claim 1, wherein said basic material is at least one member selected from the group consisting of blast furnace slag, and converter slag produced in the manufacture of iron and steel, and slags produced in the manufacture of ferronickel, ferrosilicon, nickel, stainless steel, and phosphorus.

4. A process according to claim 1, wherein said basic material is at least one of dust generated in the manufacture of carbide or cement, combustion ash of very fine coal, or a mixture thereof.

5. A process according to claim 1, wherein the phosphoric acid is wet process phosphoric acid.

6. A process according to claim 1, wherein said acidic phosphate is calcium superphosphate or ammonium phosphate.

7. A process according to claim 3 or 4, further comprising adding to the basic material at least one member selected from the group consisting of slaked lime, calcium carbonate, magnesium hydroxide, and dolomite.

* * * * *